United States Patent [19]

Chan et al.

[11] Patent Number: 5,268,027
[45] Date of Patent: Dec. 7, 1993

[54] ALKYLPOLYOL ETHERS AS COSOLVENTS FOR INK JET INKS

[75] Inventors: Dominic M. Chan, Wilmington, Del.; Howard Matrick, Highlands; Glenn M. Russo, Mullica Hill, both of N.J.

[73] Assignee: E. I. Du Pont de Nemours and Company, Wilmington, Del.

[21] Appl. No.: 994,840

[22] Filed: Dec. 22, 1992

[51] Int. Cl.$^5$ ............................................. C09D 11/02
[52] U.S. Cl. ................................. 106/20 R; 106/22 R
[58] Field of Search ..................... 106/20 R, 22 R

[56] References Cited

U.S. PATENT DOCUMENTS

| | | | |
|---|---|---|---|
| 4,237,320 | 12/1980 | Krapf et al. | 106/22 R |
| 4,291,102 | 9/1981 | Tsukahara et al. | 106/20 R |
| 4,431,450 | 2/1984 | Hasegawa et al. | 106/21 R |
| 4,923,515 | 5/1990 | Koike et al. | 106/22 R |
| 5,049,188 | 9/1991 | Takimoto et al. | 106/20 R |
| 5,151,128 | 9/1992 | Fukushima et al. | 106/20 R |
| 5,174,815 | 12/1992 | Kondo et al. | 106/20 R |
| 5,180,425 | 1/1993 | Matrick et al. | 106/20 R |

FOREIGN PATENT DOCUMENTS 10547 3/1987 Japan .

Primary Examiner—Helene Klemanski

[57] ABSTRACT

An aqueous ink jet ink comprises an aqueous carrier medium, a colorant and at least one alkylpolyol ether cosolvent selected from the group of alkyl-bis-oxyalkyldiols, olefinic oxyalkyl diols, alkyl-tris-oxyalkyldiols and alkyl-tetrakis-oxyalkyldiols exhibit rapid drying, excellent image definition, are storage stable, have low odor and have excellent decap properties.

14 Claims, No Drawings

ALKYLPOLYOL ETHERS AS COSOLVENTS FOR INK JET INKS

FIELD OF THE INVENTION

This invention relates to aqueous inks for ink jet printers. More particularly, this invention relates to aqueous ink jet inks comprising selected alkylpolyol ethers as cosolvents.

BACKGROUND OF THE INVENTION

Ink jet printing is a non-impact printing method that propels droplets of ink onto a media such as paper or transparent film in response to an electronic digital signal. Thermal drop-on-demand ink jet printers have enjoyed wide acceptance as output for personal computers in the office and the home.

Three major concerns dominate ink jet ink technology: (1) the drying rate of the printed ink, (2) print quality, and (3) reliability. Drying rate determines the printing rate and, therefore, productivity of a printer. In a sheet fed printer, the ink must be dry before the succeeding sheet contacts it or the ink will smear. The drying rate can be increased by increasing the rate of evaporation of the ink vehicle, or by increasing the rate at which the ink penetrates the substrate on which it is printed, or both.

Print or image quality is the image sharpness and contrast versus the nonimage background areas and is determined by 2 factors: (1) Color properties of the ink which are measured by optical density and color coordinates controlling hue, e.g., L*, A* and B* in the CIE-LAB 1976 color standards; and (2) Non-color image characteristics which determine the definition of the image are: a) resolution, i.e., number of dots of ink per linear unit; b) edge acuity or sharpness; and c) presence or absence of print defects such as satellite droplets or feathering. In the case of black inks, the optical density is the most important of these two factors.

A major reliability issue is the result of pen nozzles becoming plugged due to precipitation or flocculation of the components in the ink. This property is measured by decap or crust time which is defined as the time span over which a pen can be exposed to the atmosphere without failing to print. Other reliability issues are stability of the ink caused by physical or chemical changes, compatibility with equipment material, robustness towards variability in thermal firing conditions and constant drop volume over long term use.

These concerns compete with one another in that improving one often produces a detrimental effect on the others. For example, using a more volatile cosolvent will increase drying rate, but also decrease decap time. A more penetrating cosolvent will also increase drying rate, but will also lower optical density and induce feathering. In addition, many of the known penetrant cosolvents destabilize pigment dispersions and readily block pen nozzles. Increasing optical density by employing more colorant adversely effects reliability.

Accordingly, a need exists for cosolvents that will increase ink drying without causing premature nozzle pluggage, without destabilizing pigment-based inks and without degrading print quality through feathering.

SUMMARY OF THE INVENTION

In accordance with this invention, there is provided an aqueous ink jet ink composition comprising:

(a) an aqueous carrier medium;
(b) a colorant; and
(c) at least one alkylpolyol ether cosolvent having a solubility in water of at least 4.5% at 25° C., and which is selected from the group of:

(1) alkyl-bis-oxyalkyldiol compounds represented by the formula:

where n=2-6, and
D is a compound represented by the formula:

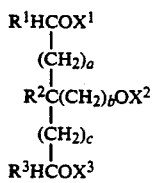

wherein
$X^1$, $X^2$, and $X^3$ represent —H, with the proviso that one of $X^1$, $X^2$, or $X^3$ on each of D represents the bond between D and —$C_nH_{2n}$;
$R^1$ is —H, —$CH_3$ or —$CH_2CH_3$,
$R^2$ is —H or $C_xH_{2x+1}$ wherein x is 1-4, and
$R^3$ is —H, —$CH_3$ or —$CH_2CH_3$;
a is 1-4,
b is 0 or 1,
c is 0 or 1;

(2) olefinic-oxyalkyl diol compounds represented by the formula:

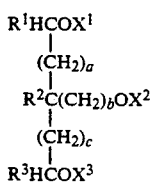

wherein
$X^1$, $X^2$, and $X^3$ represent —H, with the proviso that one of $X^1$, $X^2$, or $X^3$ represents —$C(R)_2(CH_2)_dCR$=$C(R)_2$, where d=0 or 1 and R is —H or —$CH_3$;
$R^1$ is —H, —$CH_3$ or —$CH_2CH_3$,
$R^2$ is —H or $C_xH_{2x+1}$ wherein x is 1-4, and
$R^3$ is —H, —$CH_3$ or —$CH_2CH_3$;
a is 1-4,
b is 0 or 1,
c is 0 or 1;

(3) alkyltris-oxyalkyldiol compounds represented by the formula:

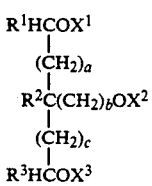

wherein
$X^1$, $X^2$, and $X^3$ represent —H, with the proviso that one of $X^1$, $X^2$, or $X^3$ represents $-C(R)_2(CH_2)_dCR=C(R)_2$, where d=0 or 1 and R is —H or —CH$_3$;

$R^1$ is —H, —CH$_3$ or —CH$_2$CH$_3$, $R^2$ is —H or $C_xH_{2x+1}$ wherein x is 1-4, and $R^3$ is —H, —CH$_3$ or —CH$_2$CH$_3$;

a is 1-4, b is 0 or 1, c is 0 or 1; and (4) alkyl-tetrakis-oxyalkyldiol compounds represented by the formula:

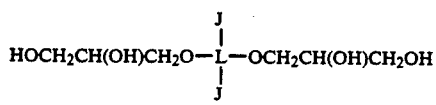

where

L is a tetravalent alkyl group, and

J is is —OCH$_2$CH(OH)CH$_2$OH or —OH.

The inks of this invention impart excellent resistance to nozzle pluggage and rapid drying by media penetration without excessive loss of image definition. They also form stable pigment dispersions, have low viscosity, exhibit excellent print quality, and are resistant to hydrolysis on storage. They may be used with a variety of ink jet printers such as continuous, piezoelectric, drop-on-demand and thermal or bubble jet drop-on-demand, and are particularly adapted for use in thermal ink jet printers.

DETAILED DESCRIPTION OF THE INVENTION

The invention relates to an ink jet ink composition which is particularly suited for use in ink jet printers in general, and thermal ink jet printers in particular. The ink jet ink composition encompasses both pigment-based inks and dye-based inks. The pigmented inks comprise an aqueous carrier medium, an alkylpolyol ether cosolvent and a pigment dispersion, which comprises pigment particles stabilized by dispersants, usually polymeric dispersants. These inks are stable over long periods, both in storage and in the printer. The dye-based inks comprise an aqueous carrier medium, a dye and an alkylpolyol ether cosolvent. The inks may be adapted to the requirements of a particular ink jet printer to provide a balance of viscosity, surface tension, resistance to nozzle pluggage, good print quality, light stability, smear resistance and water resistance.

AQUEOUS CARRIER MEDIUM

The aqueous carrier medium comprises water (preferably deionized water) or a mixture of water and at least one water soluble organic solvent other than the alkylpolyol ether cosolvent. The aqueous carrier medium is present in the range of approximately 65 to 99.89%, preferably approximately 85 to 98.5% based on total weight of the ink.

Selection of a suitable mixture of water and water soluble organic solvent depends upon the requirements of the specific application, such as desired surface tension and viscosity, the selected dye or pigment, drying time of the ink, and the type of substrate onto which the ink will be printed. Representative examples of water-soluble organic solvents are disclosed in U.S. Pat. No. 5,085,698, the disclosure of which is incorporated herein by reference.

In a preferred embodiment, the aqueous carrier medium comprises water and a water soluble organic solvent having at least 2 hydroxyl groups (e.g., ethylene glycol, diethylene glycol, triethylene glycol, etc.). The aqueous carrier medium contains from about 5% to about 95% water, with the remainder (i.e., 95% to about 5%) being the water soluble organic solvent. The preferred ratios are approximately 60% to about 95% water, based on the total weight of the aqueous carrier medium. Higher concentrations of organic solvent may result in poor print quality. Lower concentrations will lead to drying out of the printhead or crusting of the ink.

The total combined amount of aqueous carrier medium plus alkylpolyol ether cosolvent is in the range of approximately 70 to 99.8%, preferably approximately 94 to 99.8%, based on total weight of the ink when an organic pigment is selected, approximately 25 to 99.8%, preferably approximately 70 to 99.8% when an inorganic pigment is selected, and 80 to 99.8% when a dye is selected.

COLORANTS

The colorants useful in the present invention may be a pigment dispersion or a dye. The term pigment dispersion, as is known in the art and as used herein, refers to pigment particles stabilized by a dispersing agent. Preferably, the dispersing agent is a polymeric dispersant compound.

Dyes which are commonly used in aqueous ink jet inks, such as for example Acid, Direct, Food and Reactive dyes, are suitable colorants for the ink compositions of the present invention. Dyes may be used in amounts of approximately 0.2 to 20% by weight, based on the total weight of the ink.

In the preferred embodiment of the present invention, the colorant is a pigment dispersion. In addition to, or in place of the preferred polymeric dispersant compounds, surfactant compounds may be used as dispersants. These may be anionic, cationic, nonionic, or amphoteric surfactants. A detailed list of non-polymeric as well as some polymeric dispersants are listed in the section on dispersants, pages 110-129, 1990 McCutcheon's Functional Materials, North American Edition, Manufacturing Confection Publishing Co., Glen Rock, N.J., the disclosure of which is incorporated herein by reference.

Polymeric dispersants suitable for practicing the invention include AB, BAB and ABC block copolymers. In AB or BAB block copolymers, the A segment is a hydrophobic (i.e., water insoluble) homopolymer or copolymer which serves to link with the pigment and the B block is a hydrophilic (i.e., water soluble) homopolymer or copolymer, or salts thereof, and serves to disperse the pigment in the aqueous medium. Such polymeric dispersants and the synthesis thereof are disclosed in the aforementioned U.S. Pat. No. 5,085,698, the disclosure of which is incorporated herein by reference.

ABC triblock polymers useful in this invention are disclosed in Ma et al., U.S. Ser. No. 07/838,181 filed Feb. 20, 1992, the disclosure of which is incorporated herein by reference.

The block polymer is present in the range of approximately 0.1 to 30% by weight of the total ink composition, preferably in the range of approximately 0.1% to 8%. If the amount of polymer becomes too high, the ink color density will be unacceptable and it will become difficult to maintain desired ink viscosity. Dispersion stability of the pigment particles is adversely affected if insufficient polymer is present.

Useful pigments for the dispersion comprise a wide variety of organic and inorganic pigments, alone or in combination. The term "pigment" as used herein means an insoluble colorant. The pigment particles are sufficiently small to permit free flow of the ink through the ink jet printing device. Small particles are also advantageous for dispersion stability and to maximize color strength. The range of useful particle size is approximately 0.005 micron to 15 micron. Preferably, the pigment particle size should range from 0.005 to 5 micron and most preferably from 0.01 to 0.3 micron.

The selected pigment may be used in dry or wet form. Representative commercial dry and presscake pigments, including fine particles of metals or metal oxides, that may be used in practicing the invention are disclosed in the aforementioned U.S. Pat. No. 5,085,698, which is incorporated herein by reference.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. Inorganic pigments, which generally have higher specific gravities, can be employed in amounts as high as 75% by weight in some cases.

ALKYLPOLYOL ETHER COSOLVENTS

The cosolvents disclosed herein have a solubility in water of at least 4.5% (i.e., 4.5 parts in 100 parts of water) at 25° C., and are selected from the group of compounds set forth above. The alkylpolyol ethers are of four structural types:

(1) Bis-oxyalkyldiol compounds

These are derived from saturated bivalent, trivalent or tetravalent alkyl groups and consist of alkyl-bis-oxyalkyldiols, alkyl-hydroxy-bis-oxyalkyldiols and alkyl-dihydroxy-bis-oxyalkyldiols. The alkyl-bis-oxyalkyldiols are represented by the formula:

$$D-C_nH_{2n}-D$$

where n=2–6, and

D is a compound represented by the formula:

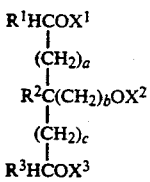

wherein $X^1$, $X^2$, and $X^3$ represent —H, with the proviso that one of $X^1$, $X^2$, or $X^3$ on each of D represents the bond between D and —$C_nH_{2n}$;

$R^1$ is —H, —$CH_3$ or —$CH_2CH_3$, $R^2$ is —H or $C_xH_{2x+1}$ wherein x is 1–4, and $R^3$ is —H, —$CH_3$ or —$CH_2CH_3$;

a is 1–4, b is 0 or 1, c is 0 or 1.

These compounds consist of two units, D, of an oxyalkyltriol and one saturated alkyl bridging unit having 2 to 6 carbons. The bridging unit is independently attached at either the number one, two or three position on each of the two oxyalkyltriol units.

A variety of oxyalkyltriols or derivatives of oxyalkyltriols may be used as starting materials, including, for example: glycerol; 1,2,3-butanetriol; 1,2,4-butanetriol; 2-methyl-1,2,3-propanetriol; 1,2,3-pentanetriol; 1,2,4-pentanetriol; 1,2,5-pentanetriol; 2,3,4-pentanetriol; 1,3,5-pentanetriol; 1,2,5-hexanetriol; 1,3,5-hexanetriol; 2-methyl-1,3,5-pentanetriol; 3-hydroxymethyl-1,5-pentanediol; 2-ethyl-1,3,5-pentanetriol; 2-n-propyl-1,3,5-pentanetriol; 2-ethyl-2-hydroxymethyl-1,3-propanediol; 2-ethyl-2-hydroxymethyl-1,3-propanediol; 1,2,6-hexanetriol; 1,2,7-heptanetriol; and 2,3,7-octanetriol.

Among the divalent alkyl group $C_nH_{2n}$, where n is 2–6, may be mentioned: 1,2-ethyl, 1,2-propyl, 1,3-propyl, 1,4-butyl, 1,3-butyl, 1,2-butyl, 1,3-(2,2-dimethyl)propyl, 1,5-pentyl, 1,6-hexyl, and the like. Excluded are geminal valencies (i.e., wherein both bonds are on the same carbon atom) as this produces acetals rather than ethers. The former are more readily subject to hydrolysis than the latter.

A preferred synthetic route where the oxyalkyltriol is glycerol is to react an alkyl diol with two moles of epichlorohydrin:

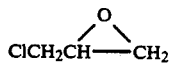

e.g., where the alkyl diol is 1,4-butanediol, the product is the diepoxide:

Several diepoxy compounds are commercially available. When hydrolyzed (often under acidic conditions), these diepoxy compounds produce alkyl-bis-oxyalkyldiol compounds. For example, the aforementioned diepoxide yields 1,4-dioxy-n-butyl-bis-1'-oxy-2',3'-propanediol:

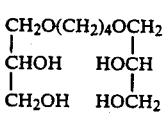

In the above illustration, the bridging divalent alkyl group was connected to each oxyalkyltriol unit at the number one position. It should be understood, however, that the bridging group can be connected to either the number one, two or three position of each oxyalkyltriol unit, to yield various isomers of the above, such as e.g.,:

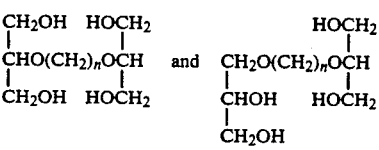

An alternate synthesis of these compounds could involve reacting alkali metal salts of the oxyalkyltriols with the appropriate alkyl dihalide. The reaction could be carried out by introducing the alkyl dihalide into an excess of oxyalkyltriol in order to minimize polymer formation. In this case, mixtures of products would be expected from the reaction analogous to the isomers described in the previous paragraph.

The alkyl-hydroxy-bis-oxyalkyldiols are represented by the formula:

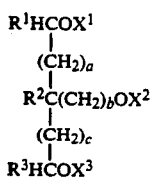

wherein
X$^1$, X$^2$, and X$^3$ represent —H, with the proviso that one of X$^1$, X$^2$, or X$^3$ represent —CH$_2$CH(OH)CH$_2$OH;
R$^1$ is —H, —CH$_3$ or —CH$_2$CH$_3$,
R$^2$ is —H or C$_x$H$_{2x+1}$ wherein x is 1–4, and
R$^3$ is —H, —CH$_3$ or —CH$_2$CH$_3$;
a is 1–4,
b is 0 or 1, and
c is 0 or 1.

An example of an alkyl-hydroxy-bis-oxyalkyldiol is:

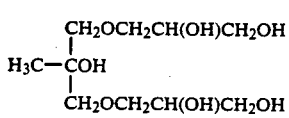

which would represent the reaction product of 2-methyl-2-hydroxymethyl-1,3-propanediol with two moles of epichlorohydrin followed by hydrolysis. Isomers of the above compound, such as:

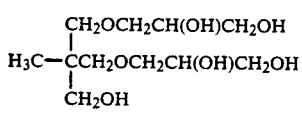

might also be present.

The alkyl-dihydroxy-bis-oxyalkyldiols are represented by the following structure:

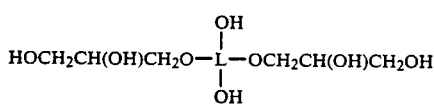

wherein L is a tetravalent alkyl group.
An example of this type is:

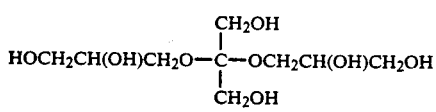

which is prepared by reacting two moles of epichlorohydrin with pentaerythritol followed by hydrolysis. Alternates to pentaerythritolinclude: 1,2,7,8-octanetetrol, mesoerythritol, and D-, L- and DL-threitol.

(2) Olefinich-oxyalkyldiol compounds
These compounds are derived from monovalent olefins, excluding vinyloxy compounds, and are represented by the structure:

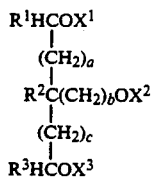

wherein
X$^1$, X$^2$, and X$^3$ represent —H, with the proviso that one of X$^1$, X$^2$, or X$^3$ represents —C(R)$_2$(CH$_2$)$_d$CR=C(R)$_2$, where d=0 or 1 and R is —H or —CH$_3$;
R$^1$ is —H, —CH$_3$ or —CH$_2$CH$_3$,
R$^2$ is —H or C$_x$H$_{2x+1}$ wherein x is 1–4, and
R$^3$ is —H, —CH$_3$ or —CH$_2$CH$_3$;
a is 1–4,
b is 0 or 1,
c is 0 or 1.

The monovalent olefin group may be attached at either the number one, two, or three position of the oxyalkyltriol unit.

The olefin oxyalkyldiols may be prepared from the olefinic halides (other than vinyl halides), such as, for example, allyl chloride, 3-chloro-1-butene, 1-chloro-2-methyl-2-butene, and the like, and an oxyalkyltriol compound. For example, reaction of allyl chloride, ClCH$_2$CH=CH$_2$, with glycerol gives a mixture of 1-(1'-allyl)-2,3-propanediol (1) and 2-(1'-allyl)-1,3-propanediol (2):

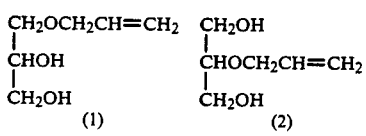

When the oxyalkyltriol is glycerol, epichlorohydrin may be reacted with an olefin alcohol as follows:

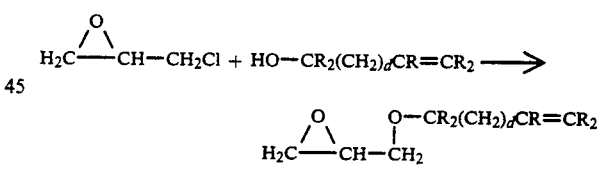

The olefin-oxyalkyldiol could then be obtained with hydrolsis:

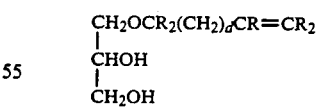

Some examples of olefin alcohols which may be used in this synthesis are: Allyl alcohol, 2-Butene-1-ol (crotyl alcohol), 2-Methyl-3-butene-1-ol, 2-Methyl-3-butene-2-ol, 3-Methyl-3-butene-1-ol, (+/−)3-Methyl-1-penten-3-ol.

(3) Tris-oxyalkyldiol compounds
These compounds are derived from saturated trivalent or tetravalent alkyl groups and comprise alkyl-tris-oxyalkyldiols and alkyl-hydroxy-tris-oxyalkyldiols.

Alkyl-tris-oxyalkyldiols are represented by the following structure:

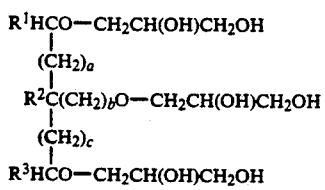

wherein
R$^1$ is —H, —CH$_3$ or —CH$_2$CH$_3$,
R$^2$ is —H or C$_x$H$_{2x+1}$ wherein x is 1–4, and
R$^3$ is —H, —CH$_3$ or —CH$_2$CH$_3$;
a is 1–4,
b is 0 or 1,
c is 0 or 1.
An example of an alkyl-tris-oxyalkyldiol is:

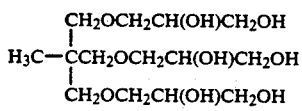

These compounds can be prepared by reacting three moles of epichlorohydrin and with an oxyalkyltriol, as illustrated below, followed by hydrolysis.

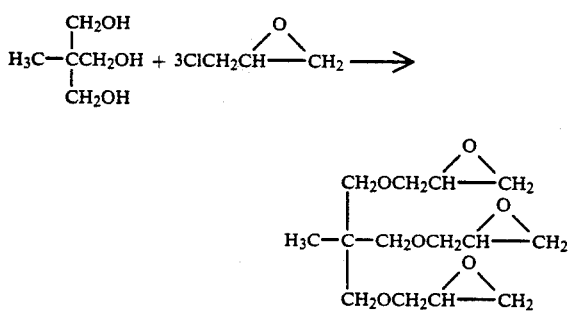

The alkyl-hydroxy-tris-oxyalkyldiols are represented by the following structure:

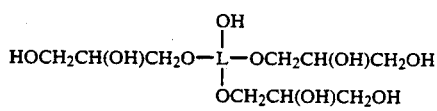

An example of an alkyl-hydroxy-tris-oxyalkyldiol is:

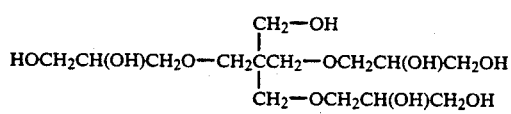

which is prepared from three moles of epichlorohydrin and one mole of pentaerythritol followed by hydrolysis.

(4) Tetrakis-oxyalkyldiol compounds

These compounds are derived from saturated tetravalent alkyl groups and comprise alkyl-tetrakis-oxyalkyldiols having the following structure:

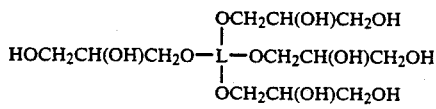

where L is a tetravalent alkyl group.
An example of an alkyl-tetrakis-oxyalkyldiol is:

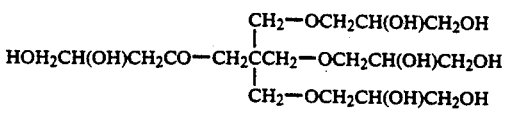

This compound is prepared by reacting four moles of epichlorohydrin with pentaerythritol followed by hydrolysis. Alternates to pentaerythritol were listed above. Polyols with more than 4 hydroxyl groups may also be useful, e.g. compounds derived from sorbitol containing from 2–6 of the 1-oxy-2,3-propanediol groups.

Mixtures of the above cosolvents may be used to optimize ink properties.

As little as 1% alkylpolyol ether cosolvent has some effect, but about 3–10%, based on the total weight of the ink composition, is a preferred range. Up to 70% by weight of the cosolvent can be employed to maximize penetration and drying rate, but at the expense of increased feathering and decreased dispersion stability.

OTHER INGREDIENTS

The ink may contain other ingredients. For example, surfactants may be used to alter surface tension as well as maximize penetration. However, they may also destabilize the pigment dispersion for pigmented inks. The choice of a specific surfactant is also highly dependent on the type of media substrate to be printed. It is expected that one skilled in the art can select the appropriate surfactant for the particular ink formulation and the specific substrate to be used in printing. In aqueous inks, the surfactants may be present in the amount of 0.01–5% and preferably 0.2–2%, based on the total weight of the ink.

Biocides may be used in the ink compositions to inhibit growth of microorganisms. Dowicides ® (Dow Chemical, Midland, Mich.), Nuosept ® (Huls America, Inc., Piscataway, N.J.), Omidines ® (Olin Corp., Cheshire, Conn.), Nopcocides ® (Henkel Corp., Ambler, Pa.), Troysans ® (Troy Chemical Corp., Newark, N.J.) and sodium benzoate are examples of such biocides.

In addition, sequestering agents such as EDTA may also be included to eliminate deleterious effects of heavy metal impurities.

Other known additives, such as humectants, viscosity modifiers, film binders and other acrylic or non-acrylic polymers made also be added to improve various properties of the ink compositions.

INK PREPARATION

The pigmented inks are prepared by dispersing the selected pigment and dispersant with water. The dispersing step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium. Alkylpolyol ethers as well as other cosolvents may be present during the dispersion. The dye-based inks are prepared in a well agitated vessel rather than in dispersing equipment.

It is generally desirable to make the ink jet inks in concentrated form, which are subsequently diluted to the appropriate concentration for use in the ink jet printing system. This technique permits preparation of a greater quantity of ink from the equipment. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the image recording material, such as, paper, fabric, film, etc., can be carried out rapidly and accurately.

The printed ink images have clear color tones, high density, excellent water resistance and lightfastness. Furthermore, the ink does not corrode parts of the ink jet printing device it comes in contact with.

EXAMPLES

The following examples further illustrate the invention.

COSOLVENT PREPARATION

A. Preparation of 1',4'-Butylene-bis-(1-oxy-2,3-propanediol)

A solution was prepared from:
40.4 g 1,4-butanediol diglycidyl ether (Aldrich Chem Co.)
30 ml tetrahydrofuran (Aldrich Chem Co.)
30 ml water The solution was cooled in an ice bath and stirred while 3.0 ml of concentrated sulfuric acid was added dropwise. After the vigorous reaction subsided, the solution was stirred overnight at room temperature. The pH was adjusted to neutral using 13 g of solid sodium carbonate and the mixture was evaporated to dryness. The residue was distilled at 0.08 mmHg and 150°–200° C. to give 22.3 g of product as a yellow liquid. NMR data agreed with the proposed structure.

B. Preparation of 1', 5'-Pentylene-bis-(1-oxy-2,3-propanediol)

To a solution of 10.4 g of 1,5-Pentanediol (Aldrich Chem. Co.) in 90 ml 50% sodium hydroxide solution, was added 56 g of epichlorohydrin (Aldrich Chem. Co.) and 5.0 g of tetrabutylammonium sulfate (Aldrich Chem. Co.). The resultant mixture was stirred for 15 hours at ambient temperature before being extracted with ethyl acetate. The ethyl acetate solution was dried over magnesium sulfate, filtered, and concentrated under vacuum to give 14.8 gm of a soft yellow-brown solid.

The solid diepoxy compound was added to a solution of 1.0 ml concentrated sulfuric acid and 50 ml water and stirred at room temperature overnight. The pH of the solution was adjusted to neutral using sodium carbonate, and then the water was removed under vacuum. The residue was distilled at 0.5 mmHg and 100°–155° C. to give a thin liquid (8.6 gm).

C. Preparation of 1-Allyloxy-2,3-propanediol
A solution was prepared from:
22.8 g allyl glycidyl ether (Aldrich Chem Co.)
30 ml tetrahydrofuran (Aldrich Chem Co.)
30 ml water The solution was cooled in an ice bath and stirred while 3.0 ml of concentrated sulfuric acid was added dropwise. After the vigorous reaction subsided, the solution was stirred over night at room temperature. The pH was adjusted to neutral using about 9 g of solid sodium carbonate and was evaporated to dryness. The residue was distilled at 0.4 mmHg and 110°–160° C. to give 11.6 g of product as a water-white liquid. NMR data agreed with the proposed structure.

DISPERSANT PREPARATION

A block copolymer of n-butyl methacrylate and methacrylic acid was prepared as follows:

3750 grams of tetrahydrofuran and 7.4 grams of p-xylene, were added to a 12-liter flask equipped with a mechanical stirrer, thermometer, nitrogen inlet, drying tube outlet, and addition funnels. The catalyst, tetrabutyl ammonium m-chlorobenzoate, (3.0 ml of a 1.0 M solution in acetonitrile), was then added to the flask. 291.1 grams (1.25 M) of an initiator, 1,1- bis(trimethylsiloxy)-2-methyl propene, were injected. Feed I which consisted of tetrabutyl ammonium m-chlorobenzoate, was started and added over 150 minutes. Feed II which consisted of 1976 gm (12.5 M) trimethylsilyl methacrylate, was started and added over 35 minutes. One hundred and eighty minutes after Feed II was completed (over 99% of the monomers had reacted), Feed III, which consisted of 1772 gm (12.5 M) butyl methacrylate, was started and added over 30 minutes.

At 400 minutes, 780 grams of dry methanol were added to the above solution and distillation commenced. During the first stage of distillation, 1300.0 grams of material with a boiling point below 55° C. were removed from the flask. The theoretical amount of methoxytrimethylsilane, having a boiling point of 54° C., to be removed was 1144.0 grams. Distillation continued during the second stage while the boiling point increased to 76° C. 5100 gms of isopropanol were added during the second stage of distillation. A total of 7427 grams of solvent were removed. The resultant resin solution contained 55.8% solids and had a neutralization equivalent of 4.65 milliequivalents of potassium hydroxide per gram of solids.

Neutralization of Dispersant

The following ingredients were added to a 1000 ml cylindrical polyethylene bottle:
200.0 grams of dispersant solution
174.4 grams of 15% potassium hydroxide
137.6 grams of deionized water The mixture was tumbled on a roller mill for 3–4 hours and then magnetically stirred for 16–20 hours to give a slightly cloudy solution.

PREPARATION OF PIGMENT DISPERSION

The following materials were added to a 1 liter beaker:

78.3 grams of deionized water
66.7 grams of neutralized dispersant solution
3.0 grams of 15% potassium hydroxide The solution was mechanically stirred while 20.0 grams of carbon black pigment, FW 18 (Degussa Corp., Ridgefield Park, N.J.) were added in portions while stirring was continued for 30 minutes. The contents were then added to a Mini Motormill 100 (Eiger Machinery Inc., Bensenville, Ill.) with another 32 grams of deionized water as a rinse and were milled at 3500 rpm for one hour. The yield was 190.8 grams. The pH was 7.6. The particle size was 138 nm as determined by a Brookhaven BI-90 Particle analyser (Brookhaven Instruments Corp., Holtsville, N.Y.).

PREPARATION OF INKS

The following ingredients were combined and added with magnetic stirring over 10-15 minutes to 22.5 grams of pigment dispersion:
2.6 grams diethylene glycol (Aldrich Chem Co.)
2.6 grams cosolvent (from Table 1)
0.5 grams Silwet ® L-77 (Union Carbide Corp., Danbury, Conn.)
37.2 grams deionized water The inks were then evaluated for decap properties, dispersion stability and drying times. Decap times were obtained on a Hewlett Packard Deskjet printer that had been altered so that the ink cartridge would not be vacuum suctioned nor spit into a spitoon. The last time interval that the particular drop did not fail was noted. Results are reported in Table 2. A longer time interval indicates a more reliable ink.

Dispersion stability was obtained by subjecting 15 grams of ink to four temperature cycles, each cycle consisting of 4 hours at −20° C. and 4 hours at 60° C. Particle sizes were measured on a Brookhaven BI-90 Particle Size Analyzer (Brookhaven Instruments Corp.) before and after cycling, and the change in particle size calculated. The large increase in particle size indicates a less stable dispersion. Results are reported in Table 3.

Drying times were obtained by rapidly printing a series of solid patterns on semi-absorbent paper (Gilbert Bond; Mead Co., Dayton, Ohio) with a Hewlett Packard DeskJet printer and then wiping the print immediately after printing and at 15 second intervals thereafter. The time at which the printed ink would no longer smear was recorded. Results are reported in Table 3. Inks with a rating of 15 seconds gave trace smears at the 15 second interval and no visible smear at 30 seconds.

TABLE 1

| Sample # | Identification | Source |
|---|---|---|
| 1 | Diethylene Glycol | Aldrich |
| 2 | Glycerol | Aldrich |
| 3 | 1-Isopropoxy-2,3-propanediol | * |
| 4 | 1-n-Butoxy-2,3-propanediol | * |
| 5 | 1-Cyclohexyloxy-2,3-propanediol | * |
| 6 | 1-(2'-Ethyl-hexyloxy)-2,3-propanediol | * |
| 7 | 2-(Butoxyethoxy)ethanol | Aldrich |
| 8 | 1-Allyloxy-2,3-propanediol | * |
| 9 | 2',2'-Dimethyl-propylene-1',3'-bis (1-oxy-2,3-propanediol) | * |
| 10 | 1',4'-Butylene-bis-(1-oxy-2,3-propanediol) | * |
| 11 | 1',5'-Pentylene-bis-(1-oxy-2,3-propanediol) | * |

*laboratory preparation from above.

TABLE 2

| Sample # | 1st Drop (seconds) | 32nd Drop (minutes) |
|---|---|---|
| 1 | 50 | 0.9 |
| 2 | 25 | 1.3 |
| 3 | 50 | 2.0 |
| 4 | 55 | 1.3 |
| 5 | 50 | 1.3 |
| 6 | 40 | 0.7 |
| 7 | 85 | 5-10 |
| 8 | 95 | >1080* |
| 9 | 50 | 60-120 |
| 10 | 50 | 180-360 |
| 11 | 65 | 720-900 |

*Test terminated at indicated time interval without a drop failure.

TABLE 3

| Sample # | Change in Particle Size (delta nanometers) | Drying Time (seconds) |
|---|---|---|
| 1 | 6 | 15-30 |
| 2 | −5 | 30-45 |
| 3 | 4 | 15-30 |
| 4 | 35 | ca. 15 |
| 5 | 29 | 0-15 |
| 6 | 159 | 0-15 |
| 7 | 44 | 0-15 |
| 8 | 17 | 0-15 |
| 9 | 10 | 0-15 |
| 10 | 6 | 0-15 |
| 11 | 10 | ca. 15 |

What is claimed is:
1. An aqueous ink jet ink composition comprising:
(a) an aqueous carrier medium,
(b) a colorant; and
(c) from 1% to 70% by weight of at least one alkyl-polyol ether cosolvent having a solubility in water of at least 4.5% at 25° C., and which is selected from the group consisting of:
(1) alkyl-bis-oxyalkyldiol compounds represented by the formula:

$$D-C_nH_{2n}-D$$

where
n=2-6, and
D is a compound represented by the formula:

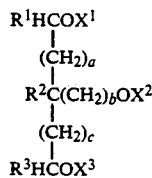

wherein
$X^1$, $X^2$, and $X^3$ represent —H, with the proviso that one of $X^1$, $X^2$, or $X^3$ on each of D represents the bond between D and —$C_nH_{2n}$;
$R^1$ is —H, —$CH_3$ or —$CH_2CH_3$,
$R^2$ is —H or $C_xH_{2x+1}$ wherein x is 1-4, and
$R^3$ is —H, —$CH_3$ or —$CH_2CH_3$;
a is 1-4,
b is 0 or 1,
c is 0 or 1;
(2) olefinic-oxyalkyl diol compounds represented by the formula:

$$\begin{array}{c} R^1HCOX^1 \\ | \\ (CH_2)_a \\ | \\ R^2C(CH_2)_bOX^2 \\ | \\ (CH_2)_c \\ | \\ R^3HCOX^3 \end{array}$$

wherein $X^1$, $X^2$, and $X^3$ represent —H, with the proviso that one of $X^1$, $X^2$, or $X^3$ represents —$C(R)_2(CH_2)_dCR$=$C(R)_2$, where d=0 or 1 and R is —H or —$CH_3$;

$R^1$ is —H, —$CH_3$ or —$CH_2CH_3$, $R^2$ is —H or $C_xH_{2x+1}$ wherein x is 1-4, and $R^3$ is —H, —$CH_3$ or —$CH_2CH_3$;

a is 1-4, b is 0 or 1, c is 0 or 1;

(3) alkyl-tris-oxyalkyldiol compounds represented by the formula:

$$\begin{array}{c} R^1HCOX^1 \\ | \\ (CH_2)_a \\ | \\ R^2C(CH_2)_bOX^2 \\ | \\ (CH_2)_c \\ | \\ R^3HCOX^3 \end{array}$$

wherein $X^1$, $X^2$, and $X^3$ represent —H or —$CH_2CH(OH)CH_2OH$, with the proviso that any two of $X^1$, $X^2$, or $X^3$ represent —$CH_2CH(OH)CH_2OH$;

$R^1$ is —H, —$CH_3$ or —$CH_2CH_3$, $R^2$ is —H or $C_xH_{2x+1}$ wherein x is 1-4, and $R^3$ is —H, —$CH_3$ or —$CH_2CH_3$;

a is 1-4, b is 0 or 1, c is 0 or 1; and (4) alkyl-tetrakis-oxyalkyldiol compounds represented by the formula:

$$\begin{array}{c} J \\ | \\ HOCH_2CH(OH)CH_2O-L-OCH_2CH(OH)CH_2OH \\ | \\ J \end{array}$$

where

L is a tetravalent alkyl group, and

J is is —$OCH_2CH(OH)CH_2OH$ or —OH.

2. The ink composition of claim 1, wherein said colorant is a pigment dispersion comprising a pigment and a dispersant.

3. The ink composition of claim 2, wherein the dispersant is a polymeric dispersant.

4. The ink composition of claim 3, wherein said polymeric dispersant comprises a block copolymer and wherein the ink composition comprises approximately 0.1 to 8% pigment, 0.1 to 8% block copolymer, and 94 to 99.8% aqueous carrier medium and alkylpolyol ether cosolvent, based upon the total weight of the ink composition.

5. The ink composition of claim 1, wherein said colorant is a dye, and wherein said ink composition comprises approximately 0.2 to 20% dye, and 80 to 99.8% aqueous carrier medium and alkylpolyol ether alkylpolyol ether cosolvent, based on the total weight of the ink composition.

6. The ink composition of claim 1, wherein the alkylpolyol ether cosolvent is an alkyl-bis-oxyalkyldiol compound represented by the formula:

$$D-C_nH_{2n}-D$$

where n=2-6, and

D is a compound represented by the formula:

$$\begin{array}{c} R^1HCOX^1 \\ | \\ (CH_2)_a \\ | \\ R^2C(CH_2)_bOX^2 \\ | \\ (CH_2)_c \\ | \\ R^3HCOX^3 \end{array}$$

wherein $X^1$, $X^2$, and $X^3$ represent —H, with the proviso that one of $X^1$, $X^2$, or $X^3$ on each of D represents the bond between D and —$C_nH_{2n}$;

$R^1$ is —H, —$CH_3$ or —$CH_2CH_3$, $R^2$ is —H or $C_xH_{2x+1}$ wherein x is 1-4, and $R^3$ is —H, —$CH_3$ or —$CH_2CH_3$;

a is 1-4, b is 0 or 1, and c is 0 or 1.

7. The ink composition of claim 5, wherein n is 3-5.

8. The ink composition of claim 5, wherein n is 4.

9. The ink composition of claim 1, wherein the alkylpolyol ether cosolvent is an olefin oxyalkyl diol compound represented by the formula:

$$\begin{array}{c} R^1HCOX^1 \\ | \\ (CH_2)_a \\ | \\ R^2C(CH_2)_bOX^2 \\ | \\ (CH_2)_c \\ | \\ R^3HCOX^3 \end{array}$$

wherein $X^1$, $X^2$, and $X^3$ represent —H, with the proviso that one of $X^1$, $X^2$, or $X^3$ represents —$C(R)_2(CH_2)_dCR$=$C(R)_2$, where d=0 or 1 and R is —H or —$CH_3$;

$R^1$ is —H, —$CH_3$ or —$CH_2CH_3$, $R^2$ is —H or $C_xH_{2x+1}$ wherein x is 1-4, and $R^3$ is —H, —$CH_3$ or —$CH_2CH_3$;

a is 1-4, b is 0 or 1, and c is 0 or 1.

10. The ink composition of claim 8, wherein R=—H and d=0.

11. The ink composition of claim 5 or 9, wherein $R^1$, $R^2$ and $R^3$ are —H, and a, b and c are 0.

12. The ink composition of claim 1, wherein the alkylpolyol ether cosolvent is an alkyl-tris-oxyalkyldiol compound represented by the formula:

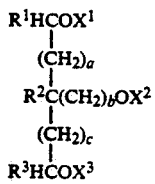

wherein
- $X^1$, $X^2$, and $X^3$ represent —H or —CH$_2$CH(OH)CH$_2$OH, with the proviso that any two of $X^1$, $X^2$, or $X^3$ represent —CH$_2$CH(OH)CH$_2$OH;
- $R^1$ is —H, —CH$_3$ or —CH$_2$CH$_3$,
- $R^2$ is —H or $C_xH_{2x+1}$ wherein x is 1–4, and
- $R^3$ is —H, —CH$_3$ or —CH$_2$CH$_3$;
- a is 1–4,
- b is 0 or 1, and
- c is 0 or 1.

13. The ink composition of claim 1, wherein the alkylpolyol ether cosolvent is an alkyl-tetrakis-oxyalkyldiol compound represented by the formula:

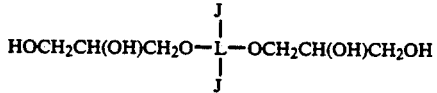

where
- L is a tetravalent alkyl group, and
- J is is —OCH$_2$CH(OH)CH$_2$OH or —OH.

14. The ink composition of claim 1, wherein the ink composition comprises a 3–10% alkylpolyol ether cosolvent based on the total weight of the ink composition.

* * * * *